United States Patent [19]

Adams

[11] 3,950,833
[45] Apr. 20, 1976

[54] ROLL COVERING COMPOSITION
[75] Inventor: Richard J. Adams, Beloit, Wis.
[73] Assignee: Beloit Corporation, Beloit, Wis.
[22] Filed: Jan. 28, 1975
[21] Appl. No.: 544,675

[52] U.S. Cl. .................................................. 29/132
[51] Int. Cl.² ....................................... B21B 31/08
[58] Field of Search ..................... 29/132, 129.5, 130

[56] References Cited
UNITED STATES PATENTS

| | | | |
|---|---|---|---|
| 2,287,768 | 6/1942 | Eckstein | 29/132 X |
| 2,393,953 | 2/1946 | Bacon | 29/132 X |
| 3,635,158 | 1/1972 | Budinger | 29/132 X |
| 3,707,752 | 1/1973 | Brafford et al. | 29/132 |

Primary Examiner—Alfred R. Guest
Attorney, Agent, or Firm—Dirk J. Veneman; Bruce L. Samlan; Gerald A. Mathews

[57] ABSTRACT

A roller having an improved covering layer and a process for making such. The covering layer has a generally continuous, seamless matrix phase and a generally circumferentially extending open-celled foam structure which is distributed throughout such matrix phase and preferably is coextensive therewith. The process involves the steps of mounting an open-celled, preformed foam layer over roll circumferential portions, depositing a liquid comprising a resin or resin precursor in the foam layer, and converting such liquid into a solid organic resin.

14 Claims, 5 Drawing Figures

ROLL COVERING COMPOSITION

BACKGROUND OF THE INVENTION

Covered rolls are used in many manufacturing processes, and coated resilient, deformable cylindrical surfaces have many well-known uses. The production of coated rolls has always presented fabricating problems, particularly when large rolls are involved where specialized, seamless coverings with excellent physical characteristics are desired.

In making, for example, fiber reinforced plastic roll coverings, it is difficult to apply the plastic to a roll so as to achieve reasonably uniform characteristics and provide a seamless covering. Conventional extrusion and molding techniques are troublesome and costly, particularly with large rolls, so that preformed coatings become a consideration, yet such coatings are difficult to mount against a roll cylinder tightly and without seams.

The present invention requires no mold or molding procedure for applying a plastic covering over a roll, is completely independent of intermediate layers, and does not involve individual fibers in any way. Thus, the present invention requires no fiber impregnated layer between roller and metal core and top layer, and no "coat moldings" such as is taught in U.S. Pat. No. 3,490,119 to Fukuyama et al.

BRIEF SUMMARY OF THE INVENTION

In one aspect, the present invention is directed to a roller having an improved covering on its circumferential, cylindrical (working) surfaces. The roller is one of the conventional type having a cylindrical body and shaft means at the opposite ends of such cylindrical body which adapt same for rotational movements. Journal means also are typically present to adapt this cylindrical body for such rotational movements, particularly on relatively large sized rollers, such as those used in paper making machines. The covering is in the form of a layer which continuously covers in face-to-face engagement circumferential surface portions of such cylindrical body.

The covering layer is comprised of organic plastic material. The layer is further characterized by having a generally continuous, seamless matrix phase, and a generally circumferentially (laterally and longitudinally) extending open-celled foam structure which is distributed throughout such matrix phase. Preferably, such foam structure is generally coextensive with such matrix phase radially.

In another aspect, the present invention is directed to a process for preparing a seamless covering on circumferential surface portions of a cylindrical body portion of a roller. In a first step, one mounts over such circumferential surface portions, a layer of an open-celled preformed foam structure which is comprised of an organic polymer. In a subsequent step, one deposits in such foam structure, a liquid comprising or containing an organic resin or organic resin precursor to form a continuous matrix phase of such liquid generally distributed throughout such foam structure. In another step, one converts such liquid to said organic resin while maintaining such liquid so distributed throughout such foam structure.

The process of this invention provides a new and very useful technique for fabricating coverings for rollers which can be well suited for making coverings for large rollers; for example, rollers used in paper making machinery. The process is suited for simple operations and can require a minimum of equipment. The process provides uniform, seamless coverings having excellent physical characteristics, the exact combination of characteristics in any given product depending upon the materials and conditions used in making a coated roller.

The foam layer not only provides a convenient means for holding a liquid resin system in close relationship to the underlying cylindrical roll surfaces during preparation of a covering, but also provides a reinforcing means in and for a product roller covering which gives added strength characteristics thereto (for example, to tangentially or laterally applied localized forces). The foam acts as a sponge during the process and as a skeleton in the product coating whose characteristics are quite distinct from conventional reinforcing means (such as fibrous fillers) in plastics. Roll coverings of the type provided by this invention are believed never to have been achieved previously.

DETAILED DESCRIPTION

Figure 1:
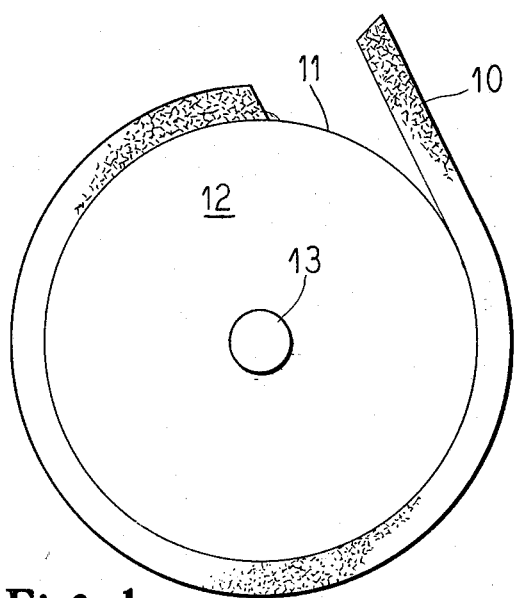
FIG. 1 is a diagrammatic transverse sectional view through a roller on whose circumferential surface portions are being mounted a layer of a foam structure.

The open-celled solid foam layer used in this invention can be in any convenient form and composition. The cells can have any convenient size, a preferred size range being from about 5 to 15 cells per lineal inch and a presently more preferred size being about 10 cells per lineal inch. The foam used may be either rigid or flexible. Many different types and compositions of foams are known and in common use and can be used in the practice of this invention. Examples of organic plastic foams include those of polyurethane, polystyrene, polyvinyl chloride, polyethylene, and the like. In such foams, expansion may be accomplished by chemical or physical techniques, common blowing agents including $CCl_3F$, pentane, 1,1 azobisformamide, and the like.

Suitable foam rubbers, for example, are produced by beating air into rubber latex with subsequent vulcanization, or by incorporating ammonium carbonate or sodium carbonate into a strongly masticated rubber stock so that the heat of vulcanization releases $NH_3$ or $CO_2$ which inflates the rubber into a desired porous mass just before the onset of vulcanization. Examples of inorganic foams include glass foams (such as one based on sodium silicate and rock wool), vitreous ceramic foams, metal foams, and the like. In general, foams which have a high capacity to absorb organic liquids are preferred for use in this invention, such as a cpacity in a given foam to absorb at last its own weight of organic liquid, though larger and smaller such capacities can obviously be used within the spirit and scope of this invention, depending upon the particular type of end product roll covering desired in any given instance.

Presently preferred foams are comprised of organic polymers. Though such foams may be thermoplastic or thermoset, thermoset foams are presently somewhat more preferred. Also, flexible plstic foams are presently preferred. Cellular plastic foam layers, such as those having an integral skin on one face thereof, may be employed; such an integral skin face can be mounted adjacent the exterior portions of the cylindrical surfaces of a base roller. In a product covered roll, rigid foams tend to be more easily machinable than flexible foams.

A presently most preferred foam is one comprised of a polyurethane. Such a polymer is produced by the condensation of a polyisocyanate and a hydroxyl-containing material such as a polyol or drying oil (e.g., the reaction of hexamethylene diisocyanate with 1,4-butanediol). Though containing characteristically many urethane or free isocyanate groups, a given such polymer molecule may have a number of other constituents. Also, though characteristically a thermoplstic polymer, it can be made thermosetting. Particularly when a polyurethane foam is employed, the organic liquid applied to a foam covered roll in making a roll covering by the teachings of this invention comprises a polyurethane moldable resin or elastomer. Polyurethane foams are commonly made by treating a polyether, such as polypropylene glycol with a diisocyanate in the presence of some water and a catalyst. The water reacts with the isocyanate groups to cause cross linking and also produces $CO_2$ which causes foaming. In other cases, trifluoromethane or similar volatile material may be used as blowing agent.

Polyurethane elastomers are made by reaction of polyisocyanates with linear polyesters or polyethers containing hydroxyl groups. Prepolymers are used as intermediates and cross linking is effected by reaction with compounds containing dihydric, diamino, or dicarboxylic groups. They may be modified for special purposes with a variety of other polymers or materials such as castor oil, as well as fillers and reinforcing agents. Polyurethane layers are formed from prepolymers containing isocyanate groups (toluene and 4,4 diphenyl methane diisocyanates) and hydroxyl-containing materials such as polyols and drying oils; such a layer is thermoset by heat. Selection of a polyurethane elastomer or layer polymer for a given matrix phase depends upon the type of roll covering desired.

A rigid type of foam is typically formed into curved layers having a desired radius of curvature approximating that of the exterior portions of the cylindrical surfaces of a base roller being covered in accord with the teachings of this invention, and then such curved foam layers are mounted on such cylindrical surfaces. The flexible type is typically used in the form of sheet members which are conformed to cylindrical surface portions of a base roller during mounting thereon.

Mounting may be accomplished by wrapping a foam about such cylindrical surfaces and fastening, abutting, or even overlapping ends together by stitching or the like, preferably using threads of a composition similar to that comprising the foam involved. An adhesive or the like may be used to adhere the foam to such cylindrical surfaces.

As indicated, the liquid deposited in a foam structure mounted upon cylindrical surfaces of a roller comprises an organic resin or a precursor therefor. Such liquid is one which converts to a solid organic resin with the passage of a relative short interval of time. Such conversion is conveniently accomplished in air at ambient pressures and temperatures, though elevated temperatures applied to such a liquid preferably may be used to accelerate such a conversion. More preferably, the resin used is one which will convert as a resin system from its starting (relative to the process of this invention) liquid form to a solid form at a temperature ranging from about 50° to 250°C in a time generally less than about 2 hours, and still more preferably, in the range of from about ½ to 15 minutes, though longer and shorter times, and higher and lower such elevated temperatures may be used. When in the converted solid form, the resin is either thermoplastic or thermoset (preferred).

The starting liquid can comprise substantially a 100 weight percent resin system. A resin system is either already in a polymerized form, or is in the form of resin precursors, such as monomers or prepolymers which react to produce a polymerized solid polymeric form. Alternatively, the starting liquid can comprise less than 100 weight percent (total weight basis) of a resin system in which event the difference between total resin system content and 100 weight percent (same basis) is a liquid carrier in which such resin system is dissolved or suspended (generically dispersed). Particularly because of problems in handling liquid carrier vaporization and removal during conversion from liquid to solid, as well as because of shrinkage problems, it is preferred to use liquid resin systems which contain at least 50 weight percent (total weight basis of resin system), as those skilled in the art will appreciate.

While a starting liquid can be applied to a foam-coated roll by the teachings of this invention in a molten form at elevated temperatures, it is preferred to use a starting liquid which can be so applied at ambient temperatures and pressures so as to avoid any problems with preheating a foam covered roller prior to such an application, which can be serious with large rollers of the size used, for example, in paper making machines.

Conventional thermosetting or thermoplastic polymeric resins are suitable for use in the practice of this invention, including elastomers, filled systems, and the like. Examples include polyurethanes (presently preferred), polyesters, polysulfones, polyacrylates, polyvinyl polymers (including plastisols), phenolformaldehyde resole resins, melamine formalehyde resins, epoxy resins, silicone resins, and the like. Latices and dispersions of elastomers such as butadiene-acrylonitrile (nitrile rubbers), butadiene-styrene (such as GR-S), neoprene (made from acetylene which is converted to vinylacetylene, then combined with hydrogen chloride), butyl rubbers (made by copolymerizing isobutylene with a small proportion of butadiene or isoprene), polysulfide rubbers, ethylene-propylene rubbers, polyurethane elastomers, silicone rubbers, fluorocarbon elastomers and the like.

Cross linking agents conventionally used include sulfur or organic peroxides (as for vulcanization of rubber), divinylbenzene (styrene polymers), organic peroxides (polyethylene), dimethylol carbonate (cellulose), and the like. Usually less than about 5 weight percent of such an agent is added to a starting liquid to produce thermosetting. Various rubber derivations can be used, such as latices or dispersions of chlorinated rubber, such as "Parlon", a trademark of Hercules, Inc., Wilmington, Delaware, for chlorinated rubbers such as chlorinated polypropylene or cyclized rubbers such as "Pliolite", a trademark of the Goodyear Tire and Rubber Company for its brand of butadiene-styrene emulsion polymer latices and vinyl-pyridine-styrene-butadiene terpolymer latices, or the like.

The liquid carrier can be water or an organic liquid. Suitable evaporatable organic liquids include alkanols, such as methanol, ethanol, isopropanol, normal butanol, and the like; esters, such as ethyl acetate, butyl acetate, amyl acetate, and the like; hydrocarbons, such as aromatic hydrocarbons derived from coal-tar distillates such as benzene, toluene, xylene, naphthas, mineral spirits, kerosine, and the like; chlorinated solvents, such as carbon tetrachloride, trichlorethylene, tetrachlorethylene, and the like; ketones, such as acetone, methylethylketone and the like; ethers; aldehydes; and the like.

The selection of a particular polymer or resin system for a particular roll covering is made preferably by a consideration of the service conditions under which the product covered roll will be used. Elastomers are presently preferred resin systems.

In a product covered roll, the coating or covering layer typically ranges in thickness from about 0.1 to 1.5 inches, though thicker and thinner coatings may be used if desired. Preferably, both a foam structure and a matrix phase are thermoset (e.g. cross linked). A presently most preferred covering employs a polyurethane foam and a polyurethane matrix phase, both preferably cross linked.

During the converting of the liquid containing the resin system (e.g. a resin or resin precursor), the roller covered with the impregnated foam is rotated, preferably at a speed in the range from about 0.1 to 40 revolutions per minute, though slower and faster such speeds may be used, depending upon circumstances. During the converting, only a portion of the area of the cylindrical roll surface need be heated, if heating is employed, at any one instant in time during such a rotation. Conventional heating means may be used, including flowing hot air, infrared heaters, an oven, or the like. Preferably, during the converting, both rotation and heating are carried out using temperatures as above indicated; the exact temperature in any given instance being indicated by the particular resin system being converted and perhaps by the type of foam structure being used.

In the depositing and converting of the liquid in the foam layer, there is a rough relationship between viscosity and cell size. The more viscous the liquid, the larger the cell size which can be conveniently used, and/or the slower the speed of rotation of the roller which need be used for ease in processing.

The steps of the process of the invention can be carried out sequentially, which is presently preferred. However, the process can also be practiced in which the deposition of starting liquid upon foam structure and the conversion of liquid into a solid resin are carried on simultaneously. For example, the deposition can be carried on at one station extending longitudinally along a roll and the conversion (heating) carried on at a second station extending longitudinally along such roll thereafter as such roll is revolved.

After a converting operation, a product covering can, if desired, be subjected to a machining operation (including abrading, grinding, turning as on a lathe, or the like) so as to remove minor surface irregularities which may be present on a covered roll and to make a product covered roll cross-sectonally continuously round.

Figure 2:
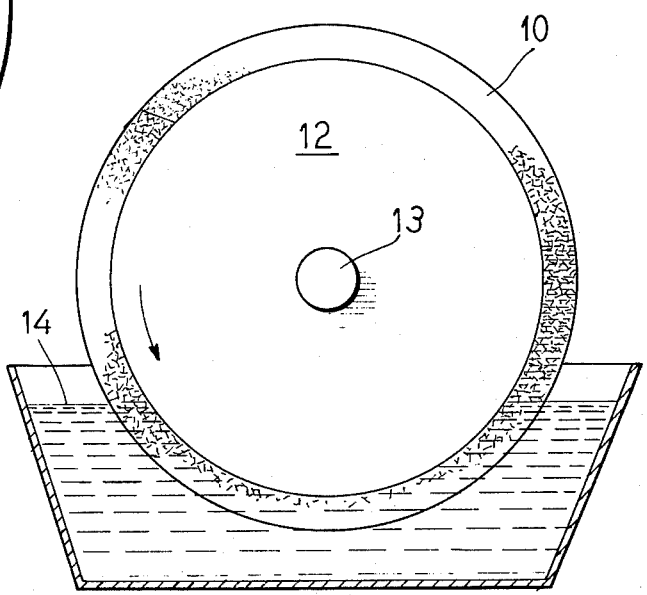
FIG. 2 is a diagrammatic transverse sectional view through the roller of FIG. 1 with the foam layer thereon being revolved in a liquid of organic resin or resin precursor.
Figure 3:
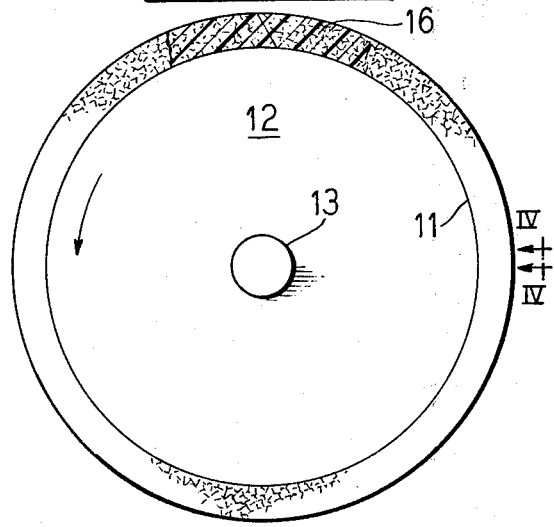
FIG. 3 is a diagrammatic transverse sectional view through the roller of FIG. 2 with foam layer equipped with a matrix phase comprised of such liquid being revolved and simultaneously heated.

One sequence of process steps using the teachings of this invention is illustrated in the accompanying FIGS. 1–3. In FIG. 1 a preformed, flexible, solid, open-celled, foam layer 10 comprised of organic polymer is being fitted to and mounted over the circumferential surface portions 11 of a roller assembly designated in its entirety by the numeral 12. Roller assembly 12 is provided with a shaft 13 at opposed ends thereof adapting surface portions 11 for rotational movements. Journal means (not shown) are provided to journal shafts 13 for rotational movements. Any conventional form of roller assembly may be used in this invention.

In FIG. 2, the thus foam covered roller assembly 12 is revolved on shafts 13 in a bath 14 of a liquid containing an organic resin system convertible into a solid resin so as to saturate the foam layer 10 with such liquid.

In FIG. 3, the foam covered liquid impregnated roller assembly 12 is heated by heater 15 so as to produce a solid matrix layer 16 over surface portions 11 as the roller assembly 12 is revolved on shafts 13. The foam layer 10 remains intact and is distributed throughout the matrix phase or layer 16 and is generally coextensive therewith.

Figure 4:
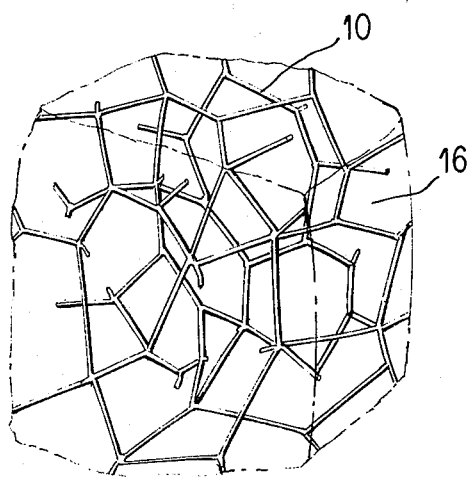
FIG. 4 is a greatly enlarged perspective view of a portion of the product roller covering of FIG. 3 taken along the line IV—IV thereof.

The appearance of a greatly enlarged portion of the covering layer is illustrated in FIG. 4. The skeletal-type structure of the foam structure 10 reinforces and adds to the strength and even wear characteristics of the matrix phase 16.

Figure 5:
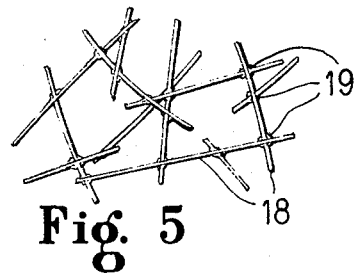
FIG. 5 is a greatly enlarged fragmentary view in perspective of an alternative form of foam structure suitable for use in the practice of the present invention.

Similar effects can be achieved by using a foam structure having the appearance shown in FIG. 5 where individual fiber lengths such as 18 are bonded to one another at positions of intercontact with one another by means of a bonding agent 19, such as an adhesive, resin or the like.

EMBODIMENTS

The present invention is further illustrated by reference to the following Examples. Those skilled in the art will appreciate that other and further embodiments are obvious and within the spirit and scope of this invention from the teachings of these present Examples taken with the accompanying Specification.

EXAMPLE 1

One layer of an open-celled solid, thermoset polyurethane foam approximately ⅛ inch thick is wrapped around steel circumferential cylindrical surfaces of a roll and the abutting, longitudinally extending layer ends (relative to the roll) are stitched together with a polyurethane fiber. The foam has about 10 cells per lineal inch.

The roll is revolved at a speed estimated to be from about 1 to 10 revolutions per minute, and a liquid polyurethane resin system is slowly poured from above onto such foam layer on roll surfaces until this foam layer appears to be substantially completely saturated with such liquid resin system. The liquid used is available commercially under the trademark "ADAPRENE" from DuPont Company. The liquid resin available under the trademark "CYANAPRENE" from American Cyanamid Company can also be used with similar results.

Thereafter, the so saturated foam layer is exposed to a heat source which selectively heats such layer to temperatures estimated to be in the range from about 210° to 240°F. Such heat is so applied for a time sufficient to substantially completely convert such liquid resin system into a solid resin which envelops and is substantially coextensive with the foam layer. The structure of the foam layer appears to have remained intact. Close examination of the product layer shows it to have a structure similar to that shown in FIG. 4. The product roll covering exhibits excellent hardness, flexibility, abrasion resistance, and resistance to impact and is well bonded to the underlying roll surface.

EXAMPLE 2

The product covered roll of Example 1 is revolved at a speed of from about 5 to 50 revolutions per minute while subjecting roll circumferential surface portions to abrasion means to remove slight surface irregularities and make the roll surfaces uniformly cross-sectionally round. The product roll is found to display properties similar to those of Example 1.

EXAMPLE 3

The procedure of Example 1 is repeated except that in place of the liquid urethane polymer system, there is employed a butyl rubber (copolymer of isobutylene (97%)) and isoprene (30%) available commercially as "Enjay Liquid Rubber" from Enjay Chemical Company.

EXAMPLE 4

The procedure of Example 1 is repeated except that in place of the liquid urethane polymer system there is employed a liquid thermosetting epoxy resin system (solution of mixture of Epikote 815 of Shell Oil Company 100 parts and triethylene tetramine 10 parts).

EXAMPLE 5

The procedure of Example 1 is repeated except that in place of the liquid urethane polymer system, there is employed a liquid thermosetting polyester resin.

EXAMPLE 6

A foam covered roll is prepared as in Example 1, and the roller is horizontally mounted so that its bottom edge contacts a bath comprising an isobutylene-type rubber in aqueous emulsion available commercially as "Enjay Butyl Latex" from Enjay Chemical Company. The emulsion contains heat activatable cross linking agents and coagulants.

The roller is revolvably driven on is axis at the speed of about 2 revolutions per minute. Upper portions of the roller are exposed to a bank of infrared heaters. After a coating of butyl rubber is formed on the roller cylindrical surfaces in and on the foam layer, the operation is ended and the so covered roller is removed.

What is claimed is:

1. In a roller of the type comprising a cylindrical body and shaft means at opposed ends thereof adapting said cylindrical body for rotational movements, the improvements which comprises a layer continuously covering in face-to-face engagement circumferential surface portions of said cylindrical body, said layer being comprised of organic plastic and being further characterized by having a generally continuous, seamless matrix phase, and a generally circumferentially extending open-celled foam structure which is distributed throughout said matrix phase circumferentially.

2. The roller of claim 1 wherein said foam structure is generally coextensive with said matrix phase radially.

3. The roller of claim 1 wherein said layer ranges in thickness from about 0.1 to 1.5 inches.

4. The roller of claim 1 wherein said matrix phase and said foam structure each comprise a thermoset resin.

5. The roller of claim 1 wherein said foam structure is comprised of polyurethane.

6. The roller of claim 5 wherein said matrix phase is comprised of polyurethane.

7. The roller of claim 1 further having journal means adapting said cylindrical body for such rotational movements.

8. The roller of claim 1 wherein said matrix phase is comprised of polyester resin.

9. The roller of claim 1 wherein said matrix phase is comprised of epoxy resin.

10. The roller of claim 1 wherein said matrix phase is an elastomeric resin.

11. The roller of claim 10 wherein said matrix phase is a butyl rubber.

12. The roller of claim 1 wherein said foam structure has from about 5 to 15 cells per lineal inch.

13. The roller of claim 1 wherein said foam structure contains about 10 cells per lineal inch.

14. The roller of claim 1 wherein said foam structure is comprised of an organic polymer.

* * * * *